United States Patent
Petersen et al.

(10) Patent No.: US 6,606,380 B1
(45) Date of Patent: Aug. 12, 2003

(54) METHOD AND ARRANGEMENT FOR CONTROLLING ALTERNATIVE ROUTING OF TRAFFIC IN A CIRCUIT-SWITCHED NETWORK

(75) Inventors: René Petersen, Valby (DK); Tommy Petersen, Albertslund (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/482,034

(22) Filed: Jan. 13, 2000

(30) Foreign Application Priority Data

Jan. 14, 1999 (EP) .............................. 99100584

(51) Int. Cl.[7] .............................. H04M 7/00
(52) U.S. Cl. ............. 379/321.01; 379/219; 379/221.02; 379/221.03
(58) Field of Search ............................ 379/219, 221.01, 379/221.02, 221.03, 221.06, 229, 220.01

(56) References Cited

U.S. PATENT DOCUMENTS

| | | | |
|---|---|---|---|
| 6,343,122 B1 | * | 1/2002 | Andersson .................. 379/219 |
| 6,411,701 B1 | * | 6/2002 | Stademann ............ 379/221.03 |

FOREIGN PATENT DOCUMENTS

| | | |
|---|---|---|
| DE | 42 09 906 | 10/1993 |
| DE | 43 22 563 | 1/1995 |
| DE | 196 21 716 | 12/1997 |
| EP | 0 550 180 | 7/1993 |
| EP | 0 699 007 | 2/1996 |
| EP | 0 699 008 | 2/1996 |
| WO | 95/32571 | 11/1995 |
| WO | 98/37712 | 8/1998 |

OTHER PUBLICATIONS

Wegner H.: "Dynamische Verkehrslenkung IM Geplanten Weitverkehrsnetz Der Deutschen Telekom", NTZ Nachrichtentechnische Zeitschrift, vol. 48, No. 12, Dec. 1, 1995, pp 10–16.

Kahsper A.N. et al., "Dynamic Routing in the Multiple Carrier International Network", IEEE Communications Magazine, vol. 33, No. 7, Jul. 1, 1995, pp. 54–61.

* cited by examiner

*Primary Examiner*—William J Deane

(57) ABSTRACT

The method comprises receiving call signalling in a node and routing the call in accordance with the call signalling. If congestion is met, it is decided whether an alternative routing is allowed in dependence on parameters associated with the call and the node and the call is routed in accordance with such allowed alternative routing. If congestion is met again or no alternative is allowed, it is decided if the call should be released or subject to crankback, dependent on parameters associated with said call and node.

By receiving indicators with the call signalling, indicating the types of alternative routing performed in preceding nodes and using said indicators as parameters for the above decisions, and updating said indicators for each call whenever alternative routing is performed for said call, the alternative routing can be controlled in an improved and simple manner.

Several types of alternative routing may be available in the nodes.

4 Claims, 3 Drawing Sheets

| | |
|---|---|
| LSH | FIRST ALTERNATIVE IN BUNDLE |
| LSH | |
| LSH | LAST ALTERNATIVE IN BUNDLE |
| ARRCIR | FIRST ALTERNATIVE IN BUNDLE |
| ARRCIR | |
| ARRCIR | LAST ALTERNATIVE IN BUNDLE |
| EDR | FIRST ALTERNATIVE IN BUNDLE |
| EDR | |
| EDR | |
| EDR | LAST ALTERNATIVE IN BUNDLE |
| ARRSEQ | FIRST ALTERNATIVE IN BUNDLE |
| ARRSEQ | LAST ALTERNATIVE IN BUNDLE |

Fig.3.

METHOD AND ARRANGEMENT FOR CONTROLLING ALTERNATIVE ROUTING OF TRAFFIC IN A CIRCUIT-SWITCHED NETWORK

This application claims priority under 35 U.S.C.§§119 and/or 365 to 99100584.4 filed in Europe on Jan. 14, 1999; the entire content of which is hereby incorporated by reference.

TECHNICAL FIELD

The present invention relates to routing and alternative routing in a telephone network or similar networks comprising several nodes. More specifically, the invention relates to improvements providing additional possibilities for alternative routing when experiencing congestion and avoiding circular routing.

BACKGROUND ART

It is known to provide nodes in such networks with alternative routing possibilities using alternative routing schemes like automatic alternative routing, automatic re-routing, load sharing and event dependent routing (CCITT recommandations, E.170). Circular routing is usually prevented by restricting the possibilities for using the alternative routing schemes, or, in more complex solutions, by detecting and eliminating loops in the routing performed (EP 550,180). The mentioned restrictions are usually provided by permitting alternative routing dependent on certain received parameters indicating the type and position of the congestion leading to the need for using alternative routing. This will often lead to release of calls which could be routed through to the destination.

DISCLOSURE OF THE INVENTION

It is an object of the invention to provide an improved alternative routing of calls in networks, said improvements preferably comprising the possibility of using alternative routing in accordance with several different routing schemes in a node and preventing circular routing by limiting the number of times a certain routing shceme is permitted for each call set-up. This is made possible by providing the call signalling with supplementary indicators indicating the types of alternative routing performed in preceding nodes. By appropriate use of these indicators it is achieved that the alternative routing of the calls may be performed less restrictive without increased risk of circular routing. The supplementary indicators make it possible to perform alternative routing for a call in a node in a situation in which the normal procedure would release the call due to the risk of circular routing.

BRIEF DESCRIPTION OF THE DRAWINGS

In the following detailed portion of the present description, the invention will be explained in more detail with reference to the exemplary embodiment of a method and an arrangement for controlling alternative routing of traffic in a circuit-switched network in accordance with the invention, shown in the drawings, in which FIG. 3 shows an example of a list of routing alternatives for a node.

DESCRIPTION OF THE PREFERRED EMBODIMENTS

In the following description, the following abbreviations and definitions are used:

ARR, automatic rerouting is an alternative routing program, in which a bundle of alternative routes are attempted and all alternatives are tried before going to the next possible routing program.

ARRCIR, automatic re-muting circular is a sub-set of the above ARR routing programs, in which the next specfied alternative compared with the last tried alternative for another call is attempted first. When meeting congestion, the next alternative in the bundle is attempted until the bottom of the bundle is reached, after which the next alternative shall be the first alternative in the bundle. All the alternatives are tried before going to the next possible bundle.

ARRSEQ, automatic re-routing sequential is another sub-set of the above ARR programs, in which the first specified alternative is always attempted first. If the call meets congestion, the next alternative is attempted until all alternatives have been tried, before going to the next possible bundle.

EDR, event-dependent routing is a routing program in which the last successful route for the previous call using the EDR bundle will be attempted first. If congestion is met, then the next alternative is attempted. All the alternatives are tried before going to the next possible bundle. When EDR is initiated, either the last successful alternative is attempted or the alternative after the last alternative tried meeting congestion.

LSH, load sharing is a program with which traffic is distributed in a specified percentage between routing alternatives in a bundle. If congestion is met on an outgoing route, the call is said to overflow to the next route in the load-shared bundle. Overflow between load-shared routes is not considered as re-routing. If the call meets congestion in the network, the load-sharing program will, dependent on the end of selection analysis, attempt the next route alternative in the bundle. All the alternatives are tried before going to the next possible bundle.

Figure 1:
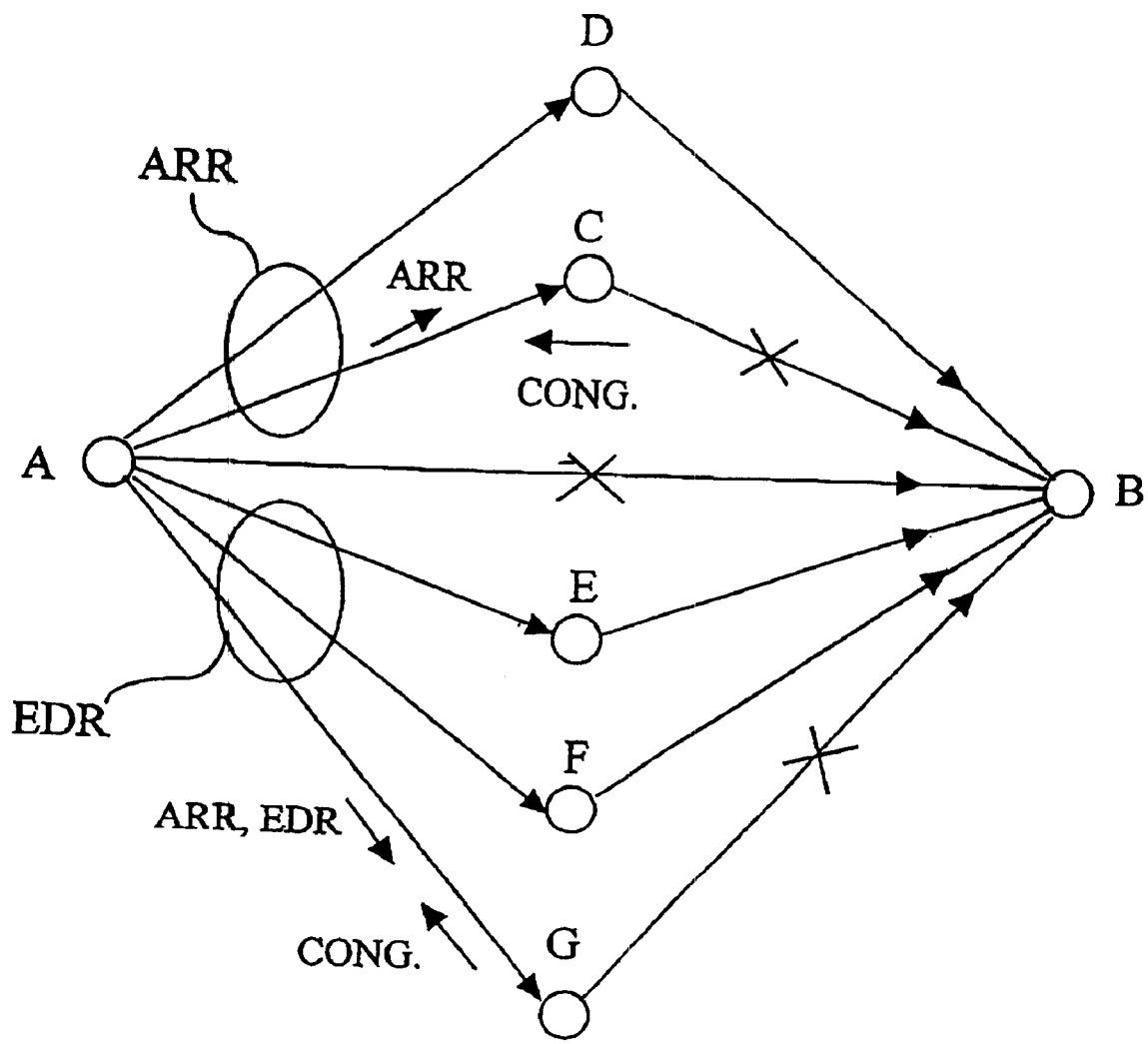
FIG. 1 shows a schematic diagram of part of a circuit-switched network, in which the present invention can be implemented, indicating the use of two different alternative routing schemes in a node.

FIG. 1 illustrates how a call arriving at node A destined for node B is first attempted to be muted directly to node B, but meets congestion on the direct route. In node A it is decided, in accordance with the parameters received with the call signalling and the congestion parameters, that alternative routing in accordance with ARR is allowed. The ARR is initiated and the call forwarded towards node C with an ARR indicator indicating that the call has been subject to re-routing in accordance with ARR. However, the call meets congestion on route CB and node C can then decide whether alternative routing is possible from node C, this decision being among other things dependent on the forwarded ARR indicator which will normally prohibit use of alternatives in accordance with an ARR scheme in node C. If no further alternatives are available in node C, a congestion information is sent backwards to node A (so-called crankback). In node A the congestion information may allow ARR routing via node D or lead to a decision that a route in EDR scheme may be selected. In the example, AG is selected and both re-routing indicators ARR and EDR are forwarded with the call signalling to node G, indicating that node G shall not allow use of these schemes if alternative routing is needed. In the example shown in FIG. 1 the call meets congestion between node G and node B and a congestion information is sent backwards to node A to indicate that routing in a succeeding switch failed. In node A it is decided, based on both ARR and EDR indicators being set, and node A only having access to those two schemes that the call will have to be relased as there is very little chance to reach node B. As can be seen from FIG. 1, the ARR routing scheme is controlling the routing via nodes C and D, and the EDR-routing scheme is controlling the routing via nodes E, F and G.

Figure 2:
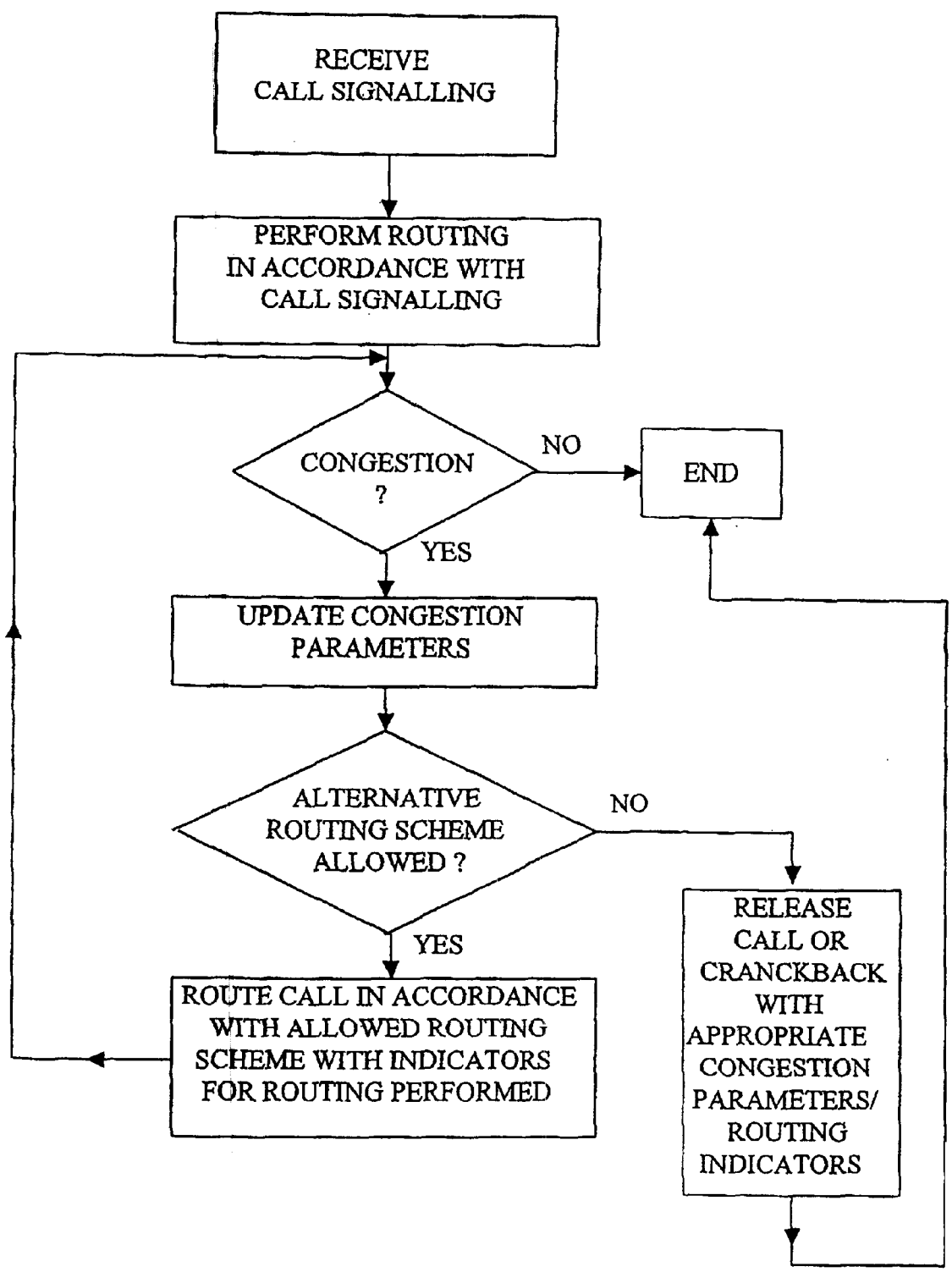
FIG. 2 shows a schematic flow diagram indicating the routing and possible alternative routing of a call in a node.

The flow diagram In FIG. 2 illustrates the process performed in node A in FIG. 1. Starting from the top, a call signalling is received in node A including possible indicators for alternative routing performed in previous nodes. As a first step, the call is routed in accordance with the call signalling, normally trying to use a direct routing corresponding to the destination node. If congestion is met during routing, congestion parameters are received back from the network and the corresponding parameters are updated in node A. After this, it has to be decided whether alternative routing according to any scheme is allowed in node A. If this is allowed, the call is routed in accordance with the first specified allowed routing scheme and routing indicators indicating that this scheme has been used are added to the indicators already received with the call signalling and forwarded with the outgoing call signalling. After this, it is again investigated whether congestion is met or not and the process Is repeated until no alternative routing scheme is allowed, whereafter the call is released or crankback is performed with appropriate congestion parameters and routing indicators, whereafter the processing in node A is ended. Naturally, the processing is also ended if no congestion is met either during direct routing or during alternative routing in accordance with any of the routing schemes used in node A.

An example of the sequence, in which different routing schemes are selected is shown in FIG. 3. Each routing scheme, LSH, ARRCIR, EDR and ARRSEQ controls the selection of several alternatives in corresponding bundles. In the example shown in FIG. 3, the first scheme selected is LSH which controls three different alternatives in a bundle. The next scheme is ARRCIR which controls three different alternatives in a bundle and is followed by EDR which controls four different alternatives and at the end ARRSEQ which controls two alternatives in a bundle. Whenever a LSH bundle is used, it will normally be specified first in the alternatives in order to achieve the full benefit of the load sharing function.

As can be seen from the above, the alternative routing of the calls is performed in dependence of parameters received with the call signalling from preceding nodes such as possible re-routing performed in a previous node, the type of routing or re-routing performed in own node and possibly the type of route failed in subsequent node. If congestion is met on outgoing routes from own node, an alternative route is normally selected and an alternative route may be selected if congestion is met further downstream in the network.

What is claimed is:

1. A method for routing a call in a circuit-switched network, said method comprising the steps of:

a) receiving a call signal at a first node;

b) attempting to route the call from said first node to a second node through a first route between said first node and said second node; and c) if said first route is congested, attempting to route said call from said first node to said second node through one or more alternate routes using an alternative routing scheme, wherein each attempt to route said call through an alternate route comprises the steps of:

i) sending a call signal from said first node to a node intermediate to said first and second nodes, said call signal including one or more indicators identifying each alternative routing scheme used previously in attempting to route said call; and ii) attempting to route said call from said intermediate node to said second node, wherein said intermediate node selects, if required, an alternative routing scheme as a function of each alternative routing scheme used previously in attempting to route said call.

2. The method recited in claim 1, wherein said alternative routing scheme is selected from the group consisting of:

load sharing, event-depending routing, automatic re-routing sequential, automatic re-routing circular, and automatic alternative routing.

3. The method recited in claim 1, wherein said one or more indicators are further used to trigger selective circuit reservation control.

4. The method recited in claim 1, wherein each alternative routing scheme is only allowed once for each call.

* * * * *